(12) United States Patent
Brezin et al.

(10) Patent No.: US 7,039,639 B2
(45) Date of Patent: *May 2, 2006

(54) OPTIMIZATION OF SYSTEM PERFORMANCE BASED ON COMMUNICATION RELATIONSHIP

(75) Inventors: Jonathan Paul Brezin, Leonia, NJ (US); Wendy Anne Kellogg, Yorktown Heights, NY (US); Mark Richard Laff, Mount Kisco, NY (US); Philip Shi-lung Yu, Chappaqua, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 56 days.

(21) Appl. No.: 09/282,860

(22) Filed: Mar. 31, 1999

(65) Prior Publication Data

US 2002/0178161 A1 Nov. 28, 2002

(51) Int. Cl.
*G06F 17/30* (2006.01)

(52) U.S. Cl. ................................. 707/10; 707/5; 707/6; 707/103; 709/206; 709/229

(58) Field of Classification Search ............... 707/1–10, 707/100–104.1; 709/202–206, 229
See application file for complete search history.

(56) References Cited

U.S. PATENT DOCUMENTS 5,619,648 A  4/1997 Canale et al. ............... 709/206
5,867,799 A * 2/1999 Lang et al. ..................... 707/1
6,006,218 A * 12/1999 Breese et al. ................... 707/3

(Continued)

OTHER PUBLICATIONS

M. Schwartz, et al., "Discovering Shared Interests Using Graph Analysis", Communications of the ACM, vol. 36, No. 8, Aug. 1993, pp. 78–89.

(Continued)

*Primary Examiner*—Shahid Alam
*Assistant Examiner*—Jean Bolte Fleurantin
(74) *Attorney, Agent, or Firm*—Gail H. Zarick; Rafael Perez-Pineiro; Anne V. Dougherty

(57) ABSTRACT

A method and apparatus for optimizing information-retrieval related system performance based on users' communication relationships. Users' interactions and relationships with each other are tracked by a 'relationship analyzer' that queries multiple heterogeneous information sources, such as e-mail logs, organization charts, calendar entries, phone logs, etc. A data structure is created for each user reflecting the intensity of communication relationship with other users, and modified over time as the data in the information sources change. A relationship group is defined based on the data structure and preference or importance ratings for each type of communication relationship that includes each user's group of highest-priority other users. A derived relationship group may also be defined based on high-priority users of a user's highest-intensity relationships. The relationship analyzer then acts as a proxy for user queries, and may modify queries and create persistent data stores or store the results of queries or sub-queries in order to improve system performance in a variety of ways: for example, to shorten retrieval time, to resolve missing or ambiguous results, to prioritize information for downloading to limited-resource computing devices, or to propagate updated information among closely related users. A way to derive a relationship group based on subject lines of communications, or other text-based content of communication-related information, is also described.

40 Claims, 15 Drawing Sheets

U.S. PATENT DOCUMENTS

| | | | | |
|---|---|---|---|---|
| 6,029,161 | A | * | 2/2000 | Lang et al. ................... 707/1 |
| 6,052,709 | A | * | 4/2000 | Paul ........................ 709/202 |
| 6,112,227 | A | * | 8/2000 | Heiner ..................... 709/203 |
| 6,308,175 | B1 | * | 10/2001 | Lang et al. .................. 707/10 |
| 6,314,420 | B1 | * | 11/2001 | Lang et al. ................... 707/3 |
| 6,411,922 | B1 | * | 6/2002 | Clark et al. .................. 703/2 |
| 6,571,243 | B1 | * | 5/2003 | Gupta et al. .................. 707/6 |

OTHER PUBLICATIONS

H. Kautz, et al., "Referral Web: Combining Social Networks and Collaborative Filtering", Communications of the ACM, vol. 40, No. 3, Mar. 1997, pp. 63–65.

H. Kautz, et al., "The Hidden Web", American Association for Artificial Intelligence, Summer 1997, pp. 27–36.

H. Kautz, et al., "Agent–amplified communication," in Proceedings of the Thirteenth National Conference on Artificial Intelligence, 1996, Menlo Park, CA, AAAI, pp. 3–9.

* cited by examiner

RNAB—Response from NAB

| John Q Smith | John Q Smith/SalesDivision/XYZCorp |
| John Q Smith | John Q Smith/MktgDivision/XYZCorp |

112

Ro—Response from Office DB

| John Q Smith | Florida |
| John Q Smith | New York |

114

Rc—Combined Response

| John Q Smith | John Q Smith/SalesDivision/XYZCorp | Florida |
| John Q Smith | John Q Smith/MktgDivision/XYZCorp | New York |

Query-on behalf of George A Jones/MktgDivision/XYZCorp
e-mail name for *John Smith?* — 1064

Response — 107

| John Q Smith | John Q Smith/SalesDivision/XYZCorp |
| John Q Smith | John Q Smith/MktgDivision/XYZCorp |

Relationship Data-for George A Jones/MktgDivision/XYZCorp

| John Q Smith/SalesDivision/XYZCorp | 10 | — 1081 |
| John Q Smith/MktgDivision/XYZCorp | 20 | — 1082 |

Sorted Response — 116

| John Q Smith | John Q Smith/MktgDivision/XYZCorp |
| John Q Smith | John Q Smith/SalesDivision/XYZCorp |

RELATIONSHIP VALUES FOR "JO" (700)

|  | FRED | PAT | SAM | AL | MICKEY |
|---|---|---|---|---|---|
| RI("ORG CHART") | 0.8 | 0.5 | 0.5 | 0.1 | 0.0 |
| RI("MAILING LIST") | 0.7 | 0.6 | 0.2 | 0.0 | 0.5 |
| RI("CALENDAR") | 0.2 | 0.6 | 0.6 | 0.0 | 0.1 |
| R("JO") (SUM) | 1.7 | 1.7 | 1.3 | 0.1 | 0.6 |

PREFERENCE RATINGS FOR INFORMATION SOURCES (702):
{P("ORG CHART")=0.2, P("MAILING LIST")=0.5, P("CALENDAR")=0.3}

WEIGHTED RELATIONSHIP VALUES (703)
RP("JO", (FRED...))  0.57   0.58   0.38   0.02   0.28

RELATION-GROUP CUTOFF (704)
RGcutoff = 0.35

RELATION-GROUPS FOR "JO" (705)
RG("JO")={FRED, PAT, SAM}

WEIGHTED RELATIONSHIP VALUES FOR FRED (706)

|  | PAT | SAM | AL | MICKEY | JO |
|---|---|---|---|---|---|
| RP("FRED", Y) | 0.4 | 0.6 | 0.2 | 0.8 | 0.6 |

DERIVED RELATION-GROUP CUTOFF (707)
DRGcutoff = 0.5

DERIVED RELATION-GROUP FOR JO (708)
DRG("JO")={FRED, PAT, SAM, MICKEY}

OPTIMIZATION OF SYSTEM PERFORMANCE BASED ON COMMUNICATION RELATIONSHIP

FIELD OF THE INVENTION

The present invention relates generally to improving system performance based on users' communication behaviors. More particularly, the present invention is related to inferring close communicative relationships from multiple, heterogeneous information sources typically found in large organizations, and how to use such information to improve the speed and quality of information retrieval. A more particular aspect of the present invention is related to optimizing performance of user queries against large name and address databases, prioritizing query results for display on devices having limited resources; and propagating updates to large databases from the users who obtain the updates earliest.

BACKGROUND

The value of the Internet, intranets, and other communications media, resides largely in the ability of the users of such systems to communicate efficiently and easily with each other. In the course of so doing, many resources for communication are provided by systems and organizations, for example: records of names, e-mail addresses and other contact information, shared calendars, organization charts, etc. However, in large systems such as these, many operations become slow or clumsy for users: for example, resolving addresses, keeping contact information up to date, retrieving information about other users, etc. A main reason for delays in user response time is the sheer enormity of the data structures that typically hold this information, for example, large databases that must be queried to resolve recipient addresses before e-mail can be sent.

The prior art has addressed the use of a single information source, such as an e-mail log, or web pages to facilitate human to human interaction. For example, the prior art includes systems aimed at finding experts and/or people with shared interests in particular areas more easily. Schwartz and Wood, "Discovering Shared Interests Using Graph Analysis," Communications of the ACM, vol. 36, no. 8, 1993, pp. 78–89, present a scheme for deducing shared interests among users from a history of their e-mail communication. An undirected graph is constructed based on the To: and Cc: fields of an e-mail log; the graph is then reduced and heuristic algorithms are run to identify people with similar patterns of communication (e.g., many correspondents in common). They show that these attributes of e-mail can be useful for discovering users with shared interests.

Similarly, web pages have been used as an information source to determine shared interests. Kautz, Selman, and Shah, "The Hidden Web," AI Magazine, AAAI, Summer, 1997, pp. 27–36 and "Combining Social Networks and Collaborative Filtering," Communications of the ACM, vol. 40, no. 3, 1997, pp. 63–65 present a system called "Referral Web" that allows users to discover human experts related to a topic of interest. An early version of their system used the Schwartz and Wood (1993) method of building a referral web on the basis of an e-mail log (Kautz, Selman, & Milewski, "Agent-amplified Communication," in Proceedings of the Thirteenth National Conference on Artificial Intelligence, 1996, Menlo Park, Calif.: AAAI, pp. 3–9). A more recent version of the Referral Web builds its network using web pages, specifically the co-occurrence of names in publicly-available documents (Kautz, Selman, & Shah, 1997). Once a network model has been constructed for an individual, it is made available to the user to find experts who might be able and willing to answer questions. The authors have also applied the Referral Web technique to online bibliographies in the academic community, to build more specialized webs of, for example, a research area. The Referral Web as described in these publications is not able to resolve ambiguity among users with the same name.

Another area of prior art concerns using information about users' e-mail correspondents to reduce the amount of junk e-mail received by a user of an e-mail system. An example of this is U.S. Pat. No. 5,619,648, entitled "Message Filtering Techniques," issued Apr. 8, 1997 to Canale et al. The techniques described by Canale et al. pertain to a system for locating expertise.

None of the prior art, however, makes use of communication patterns to enhance system performance. The prior art also does not address creating an integrated communication pattern based on more than one information source. Thus, there is a need to build a more complete picture of a user's relationships with others based on their communication activity or organizational relatedness, and to use the model so constructed to enhance system resources and performance. The present invention addresses these needs.

SUMMARY

In accordance with the aforementioned needs, the present invention is directed to a method and apparatus for optimizing and enhancing system performance based on tracking user behaviors and organizational information sources that signify communication relationships, and performing computations on the data from these multiple, heterogeneous sources to construct a representation of the importance of other correspondents for a given user.

A method having features of the present invention for optimizing information retrieval includes the steps of: extracting and integrating relationship information from multiple heterogeneous information sources; building and storing a data structure to represent the relationship information; and modifying a query based on the relationship data structure.

Another aspect of the present invention, includes the step of: modifying a query based on one or more of: a relationship group derived from communication intensities measured on various communication channels; a derived relationship group computed from a second relationship group of one of the entities in the first relationship group; or a relationship group derived from subject-based information (i.e., representations of the content of communications).

BRIEF DESCRIPTION OF THE DRAWINGS

These, and further, objects, advantages, and features of the invention will be more apparent from the following detailed description and the appended drawings wherein:

FIGS. 4A–B depict an example of a query modification and result combination;

FIGS. 5A–B depict an example of a query optimization, with prioritizing and filtering steps;

DETAILED DESCRIPTION

Figure 1:
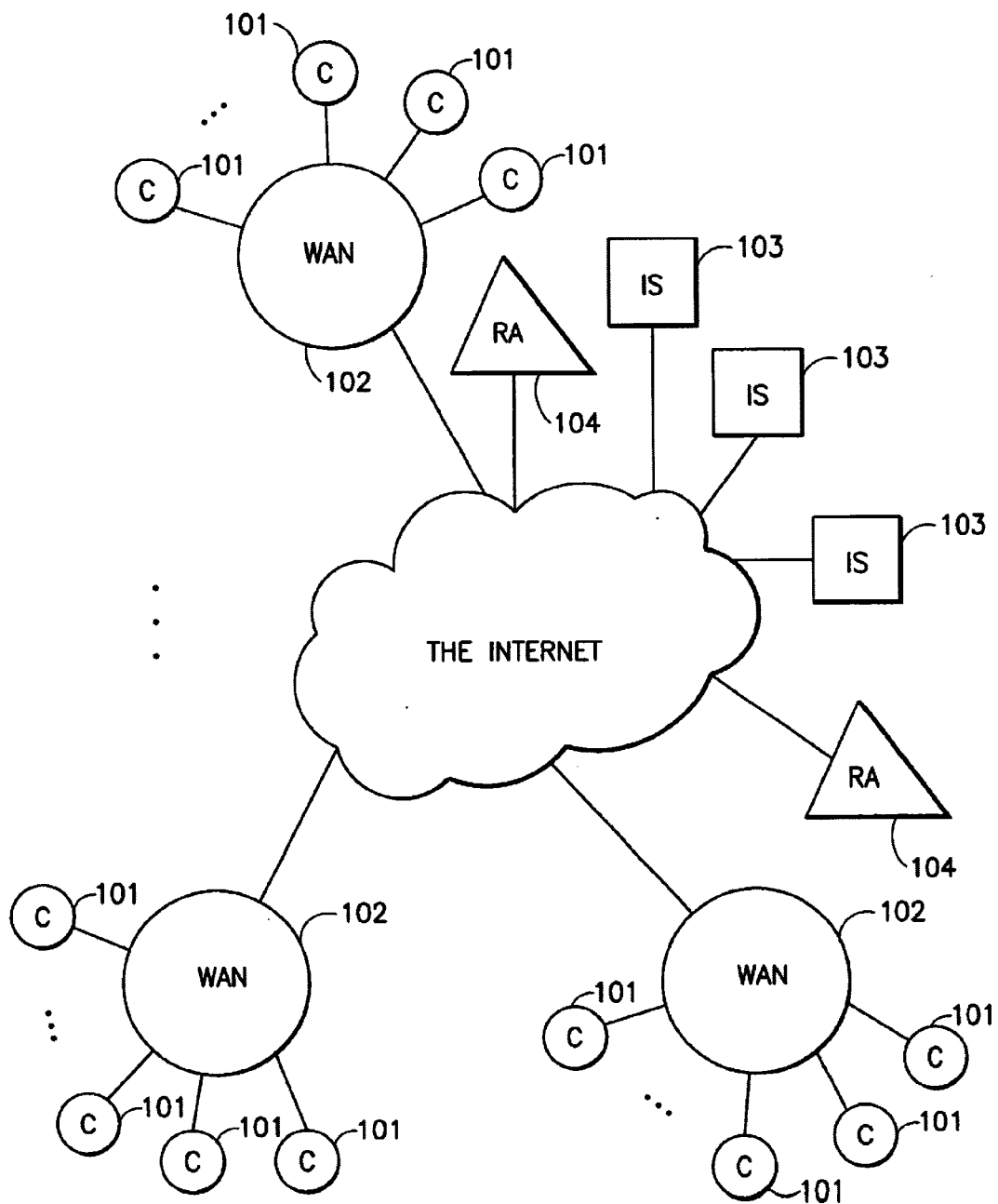
FIG. 1 depicts an example of an Internet environment having features of the present invention.

FIG. 1 depicts an example of an Internet environment having features of the present invention. As depicted, one or more information sources ("IS") (103) and one or more client nodes ("C") (101), and one or more relationship analyzers ("RA") (104) are connected to the Internet (100) either directly or through a wide-area-network (WAN) (102). An information source node (103) can be any computing node that can store information and retrieve it when presented with an appropriate query. A client node (101) can be any computer connected to the Internet through which a user (101) creates queries (106) to be sent to the information sources (103) and receives the results of the queries either visually or by audio means. The present invention includes features that improve the speed and accuracy of the query and retrieval task through the introduction of a Relationship Analyzer (104).

Figure 2:
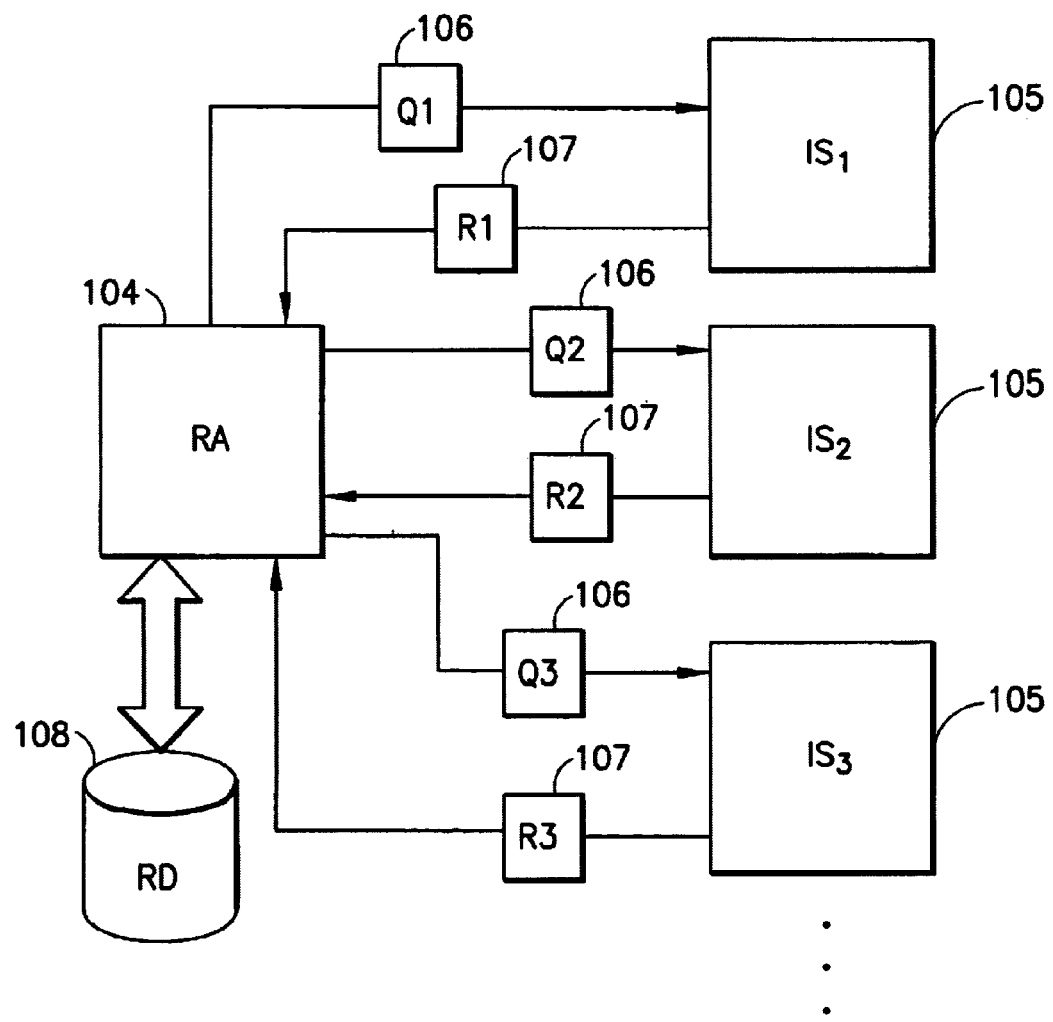
FIG. 2 depicts an example of the Relationship Analyzer (RA) and its interactions with Information Sources (IS) and a Relationship Database (RD)

FIG. 2 depicts an example of the Relationship Analyzer (RA) and its interactions with Information Sources (IS) and a Relationship Database (RD). As depicted, the relationship analyzer (RA) (104) may, as necessary, present its own queries (Q1 . . . Qn) (106) to one or more information sources (105), build and store a relationship data structure (RD) (108) which represents relationships inferred from the results (R1 . . . Rn) (107) of these queries.

In a preferred embodiment, the RD (108) stores one or more collections of "relationships." A relationship R(x,y) is a numeric value linking two users, "x" and "y" indicating the "importance" of user "y" to user "x." By way of example only, a value of "0" can indicate "y" is not at all important to "x," whereas a value of "100" can indicates that "y" is very important to "x." An example of the computation and use of the RD will be described in more detail below.

In a preferred embodiment, a relationship group representing the most important correspondents for a given user is constructed and maintained. This representation is then used to enhance or optimize system performance. Examples of user behaviors include: recipients and senders of e-mail; phone; pager; fax, or other communications initiated by the user or by others in the user's network of correspondents; calendar entries (e.g., meetings shared with others), information in organization charts; or other forms of machine or human-readable information. Examples of computations include: simple frequency counts of communication events; weighted functions of events; and extraction of selected events. Examples of enhanced or optimized system performance include: query reformulation; information retrieval; updating of records; and transformation of information according to attributes of the receiving device.

Figure 3:
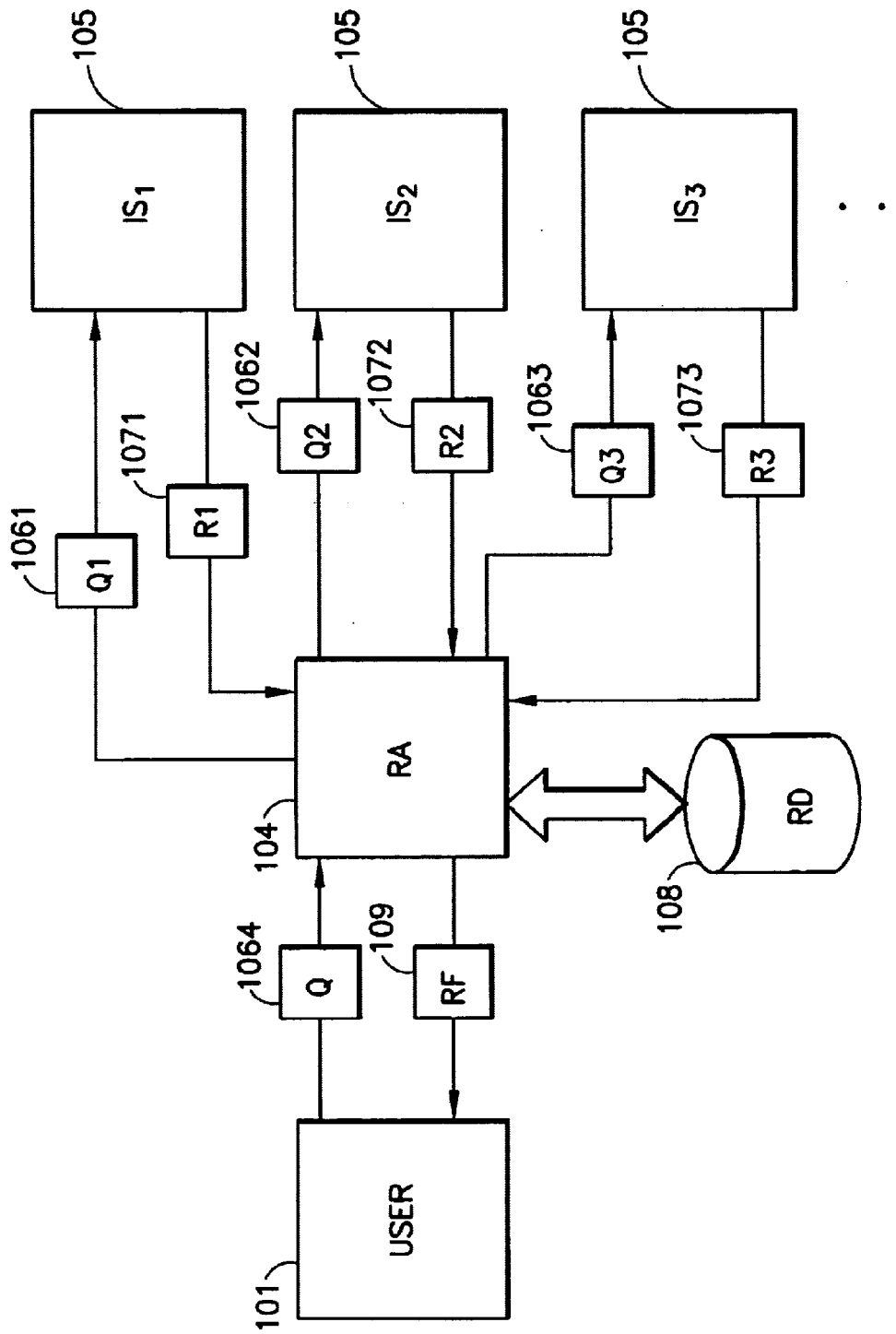
FIG. 3 depicts an example of query modification and filtering under the operation of the RA.

FIG. 3 depicts an example of query modification and filtering by the RA. As depicted, once the RD (108) has been built, subsequent user queries (1064) are received by the RA (104), which may modify the query (1061 . . . 1063) based on the relationship data stored in the RD (108), execute the query on behalf of the user. The RA may then modify (109) the query results (1071 . . . 1073) of the query also based on the data in the RD (108) (as will be discussed in more detail with reference to FIG. 4).

By way of example only, in the Lotus Notes™ system, one information source, called the Name and Address Book maintains a correspondence between a user name and their e-mail address. As typically deployed, Lotus Notes™ provides for one or more Name and Address Books (NAB) to be queried to find a desired e-mail address. In order to completely address a new e-mail item, the name "John Smith" typed as the recipient-name must be fully resolved among the many "John Smith's" in the NAB, e.g., ("John Q Smith/SalesDivision/XYZCorp"). If XYZCorp is very large, this name-to-address resolution yields multiple "hits" among which the user must choose.

Figure 4A:
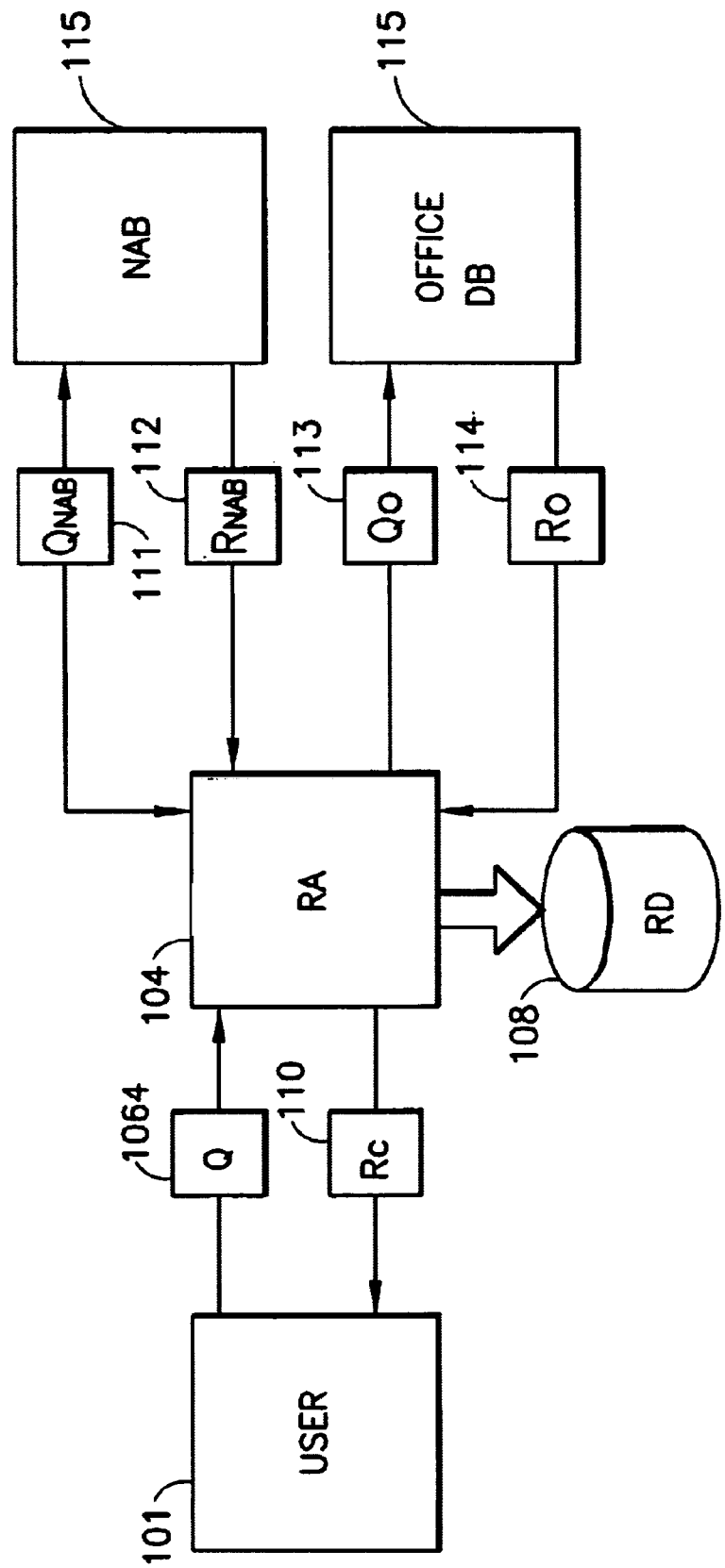

FIGS. 4A–B depict examples of query modification and result combination. As depicted, a user (101) sends a query (1064) to find an e-mail address for a particular "John Q Smith". The RA (104) receives the query and modifies it based on information stored in the RD (108), in this case to extend the query to other information sources. The RA (104) generates the original "e-mail address" query $Q_{NAB}$ (111) to the NAB (115) and an "office address" query $Q_O$ (113) to the Office DB (116). The RA (104) receives the results $R_{NAB}$ (FIG. 4B, 112) from the NAB (115) and the results $R_O$ (FIG. 4B, 114) from the Office DB (116). The RA then combines the "e-mail address" results $R_0$ (FIG. 4B, 112) with the results $R_0$ (FIG. 4B, 114) from the Office DB (116). The RA returns the combined result $R_c$ (FIG. 4B, 110) to the user (101), allowing the user to discriminate between "John Q Smith in Florida" and "John Q Smith in New York."

Figure 5A:
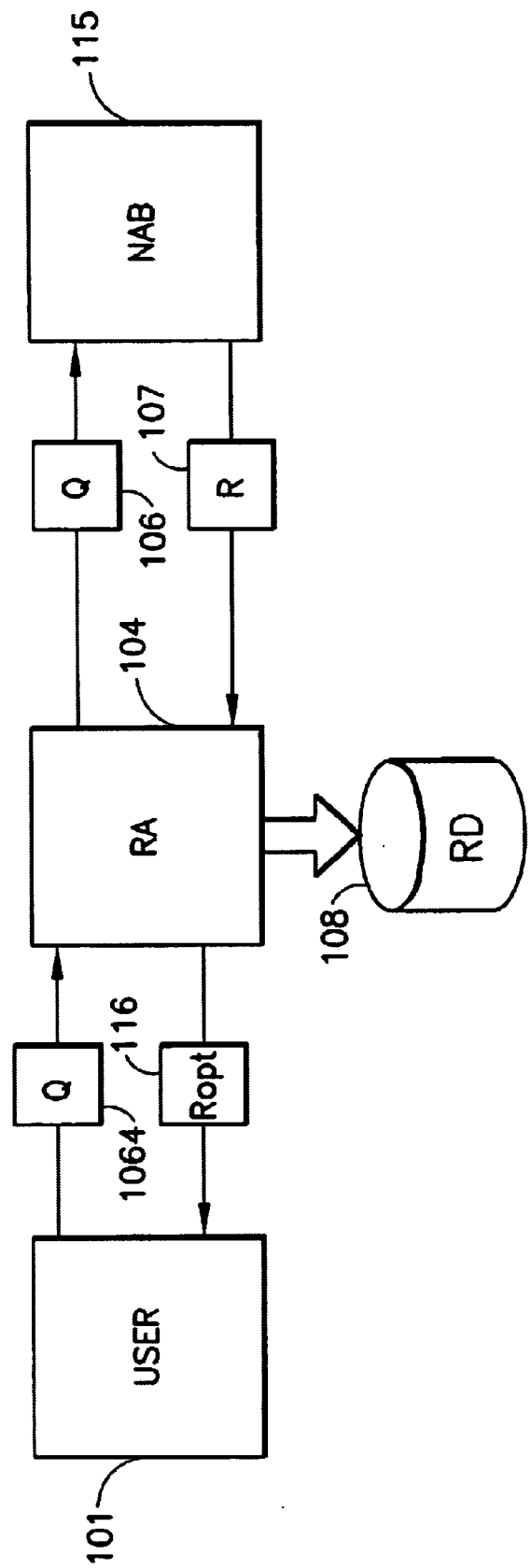

FIGS. 5A–B depict an example of a query optimization, with prioritizing and filtering steps. As depicted, a user (101) "George Jones" of the marketing Division of XYZ Corp. sends a request (Q) (FIG. 5A, B 1064) to the RA (104) for a full e-mail address for "John Smith." The RA sends a query (1065) to the corporate NAB (115), which responds (FIG. 5A, B 107) with a list (1080) of people that satisfy the search criterion ("name=John Smith"). Once retrieved, the RA can use conventional sorting techniques to sort the list. According to the present invention, the list is sorted based on relationship values (1081, 1082) stored in the RD (108) and the optimized (sorted) response $R_{opt}$ (FIG. 5A, B 116) is returned to the requester. In this example, the higher the relationship value between George Jones and an individual in the list (1080), the closer to the beginning of the list that person is displayed.

Figure 6:
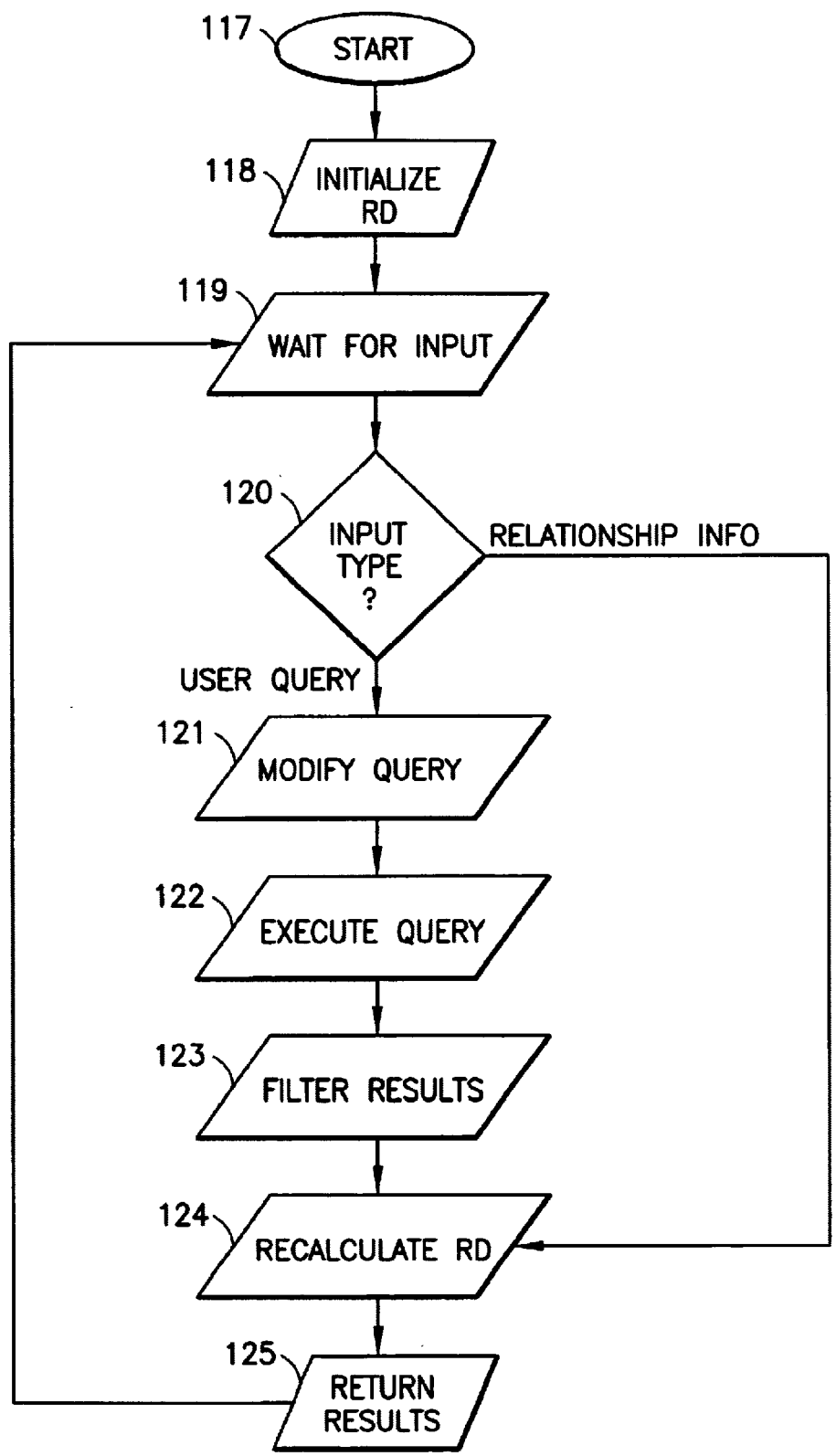
FIG. 6 depicts an example of a logic flow for the RA.

FIG. 6 depicts an example of a logic flow for an RA having features of the present invention. As depicted, in step 118, the relationship database (RD) (108) is populated with a graph of users, relationship arcs, and relationship values (described in more detail in FIGS. 7A–B). The relationship analyzer then enters a loop waiting for input, in step 119, for example either a user query, initiated by an interactive user, or updated relationship information (sent periodically from the information source (103, 105), or incrementally as the information source changes). In the case of a user query, the query is modified in step 121, (further explained in FIG. 9), and executed in step 122 (further explained in FIG. 10). The results are filtered in step 123 (further explained in FIG. 11) and the query results are used to recalculate the relationships in the relationship database in step 124 (further described in FIG. 8). In the case where the input is relationship information (i.e., not a query), the updated relationship information is used to update the relationship database (step 124). Finally, the results of the query are returned to the user in step 125.

Figure 7A:
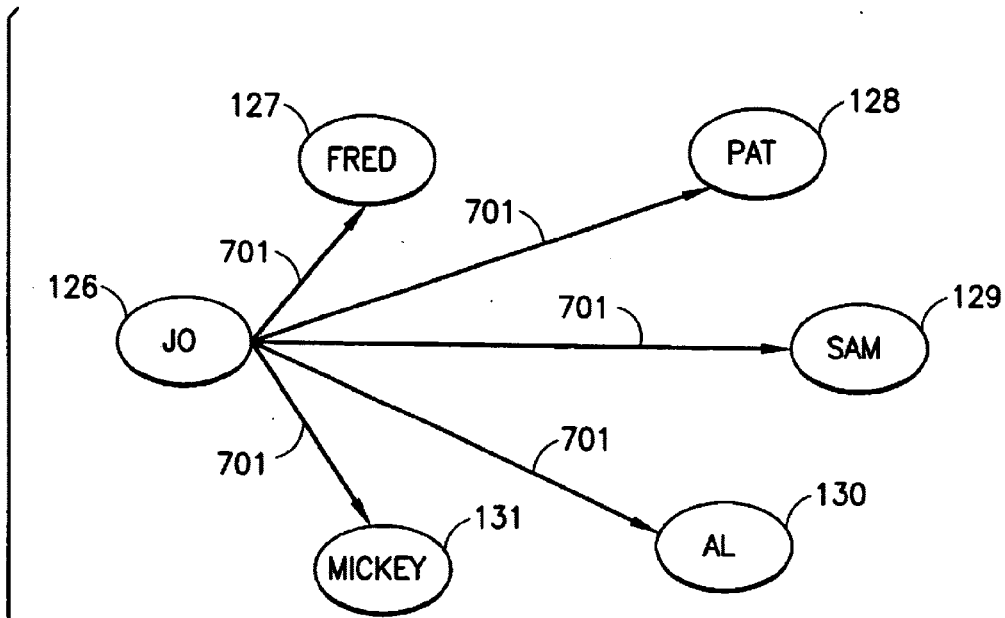
FIGS. 7A–B depict a sample relationship graph and a sample derived relationship graph.

By way of overview, in a preferred embodiment, a main component of the relationship database is a relationship graph (FIG. 7*a*). In a fully constructed relationship graph, each person is represented by a node and the relationship information pertaining to two people is represented by an arc between the nodes for the respective people. The arc is labeled with a vector containing the relationship values computed as described in FIG. 9.

FIG. 7A depicts a sample relationship graph. As depicted, relationship value arcs (701) indicate communication relationships between a user "Jo" (126) and colleagues "Fred" (127), "Pat" (128), "Sam" (129), "Al" (130), and "Mickey" (131). The relationship values for three information sources are shown below in Table 1.

TABLE 1

Relationship Values for "Jo"

|  | Fred | Pat | Sam | Al | Mickey |
|---|---|---|---|---|---|
| Ri("Org Chart") | 0.8 | 0.5 | 0.5 | 0.1 | 0.0 |
| Ri("Mailing List") | 0.7 | 0.6 | 0.2 | 0.0 | 0.5 |
| Ri("Calendar") | 0.2 | 0.6 | 0.6 | 0.0 | 0.1 |
| Ri("Jo")(sumRi's) | 1.7 | 1.7 | 1.3 | 0.1 | 0.6 |

The relationship values on the arc (701) between "Jo" (126) and "Fred" (127) are shown in the first column of Table 1. The relationship value R(Jo,Fred) is shown at the bottom of the first column.

Preference weightings can be assigned to the information sources. For example,

Preference ratings for information sources:

{$P$("Org Chart")=0.2, $P$("Mailing List")=0.5, $P$("Calendar")=0.3}.

The preference weightings can be used to derive weighted relationship values between Jo and the other members of the relationship graph. For example, Weighted Relationship Values:

|  | Fred | Pat | Sam | Al | Mickey |
|---|---|---|---|---|---|
| Rp("Jo",( Fred, ...)) | 0.57 | 0.58 | 0.38 | 0.02 | 0.28 |

A relationship group cutoff value can also be used to establish a threshold value required to infer a relationship. For example, Relation-Group Cutoff (704)

RG cutoff=0.35

In this example, the resulting relationship groups for Jo (the computation of which will be discussed in more detail with reference to FIG. 9) are:

Relation-Groups For "Jo" (705)

RG("Jo")={Fred, Pat, Sam }

Figure 7B:
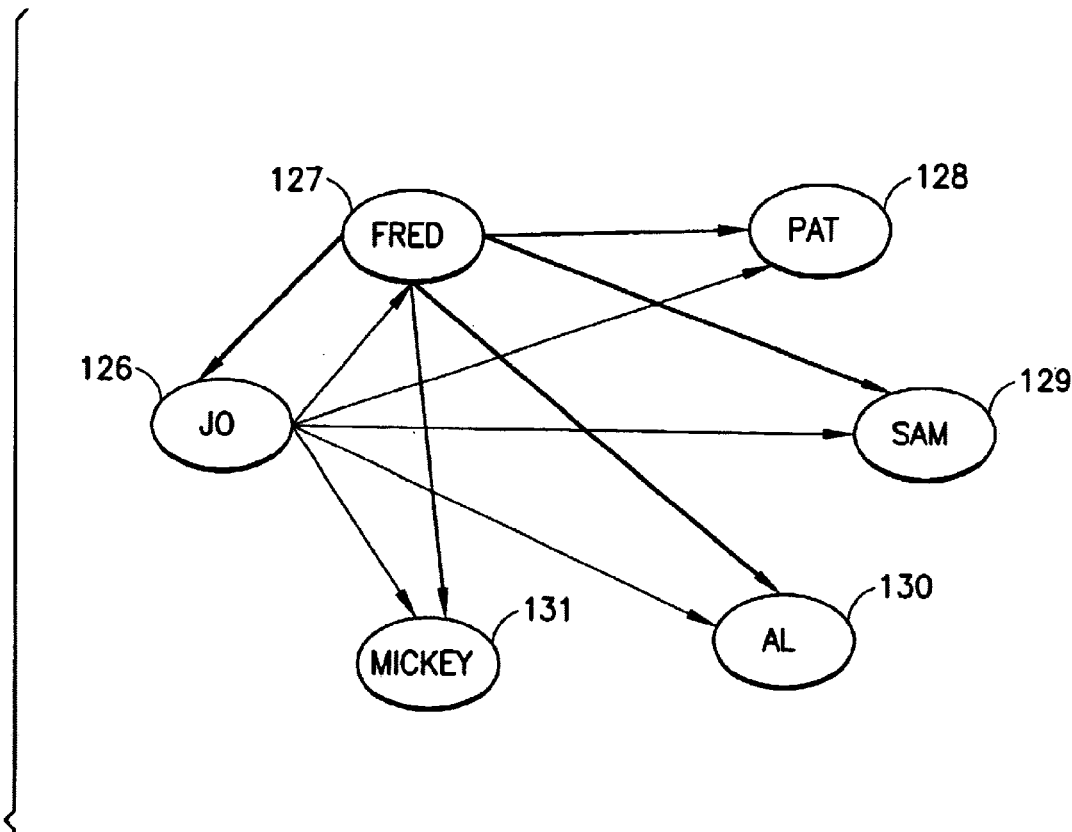

FIGS. 7B depicts a sample derived relationship graph. As depicted, a sample derived relationship group (DRG) for user "Jo" (126) DRG("Jo")={Fred, Pat, Sam, Mickey } is computed from:

1) the weighted relationship values for user "Fred" (127);

Weighted Relationship Values for Fred (127)

|  | Pat | Sam | Al | Mickey | Jo |
|---|---|---|---|---|---|
| Rp("Fred", y) | 0.4 | 0.6 | 0.2 | 0.8 | 0.6 |

2) the derived relation-group cutoff;

DRG cutoff=0.5 and 3) the information described with reference to FIG. 7A.

Figure 8:
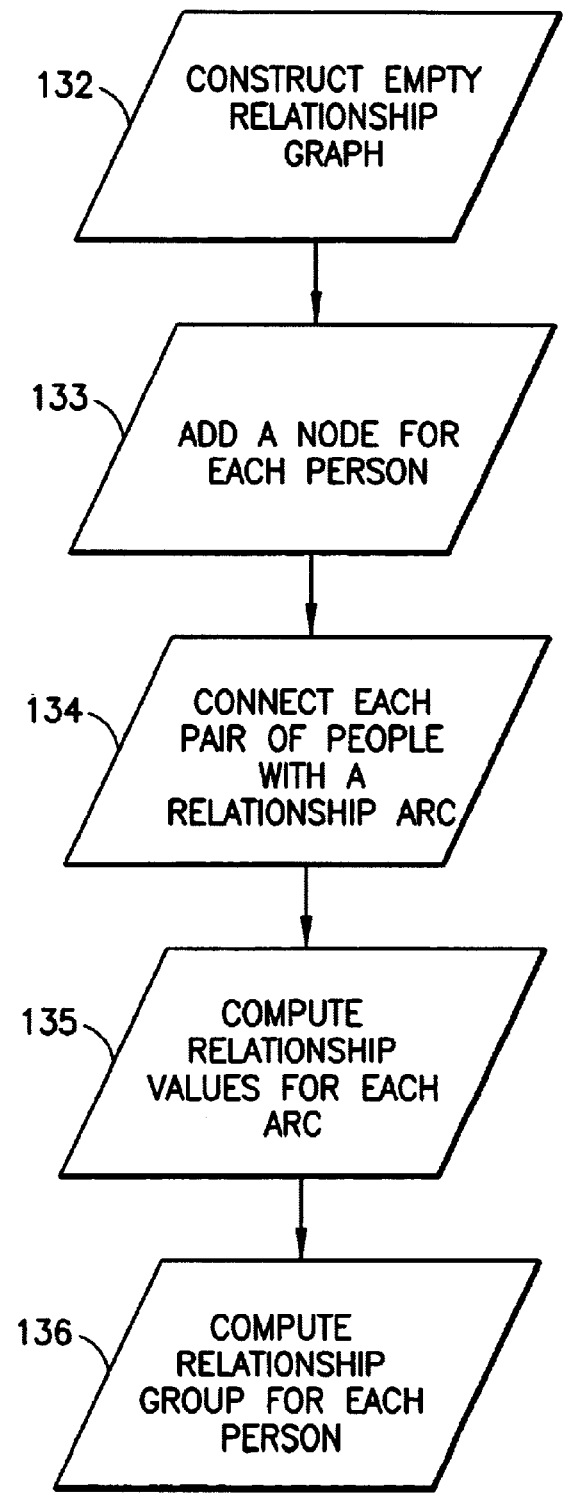
FIG. 8 depicts a detailed example of logic for the initialization step.

FIG. 8 depicts a detailed example of logic for the initialization step (FIG. 6, step 118) of the relationship database (RD). As depicted, in step 132, an empty relationship graph is constructed. In step 133, a list of all people is constructed by querying each information source (IS) and merging the resulting lists. A node is added to the graph for each person in the list. Each pair of people is connected by an empty relationship arc (step 134) which is then populated with the relationship values computed in step 135. A relationship group is then computed and stored in the RD (step 136).

Figure 9:
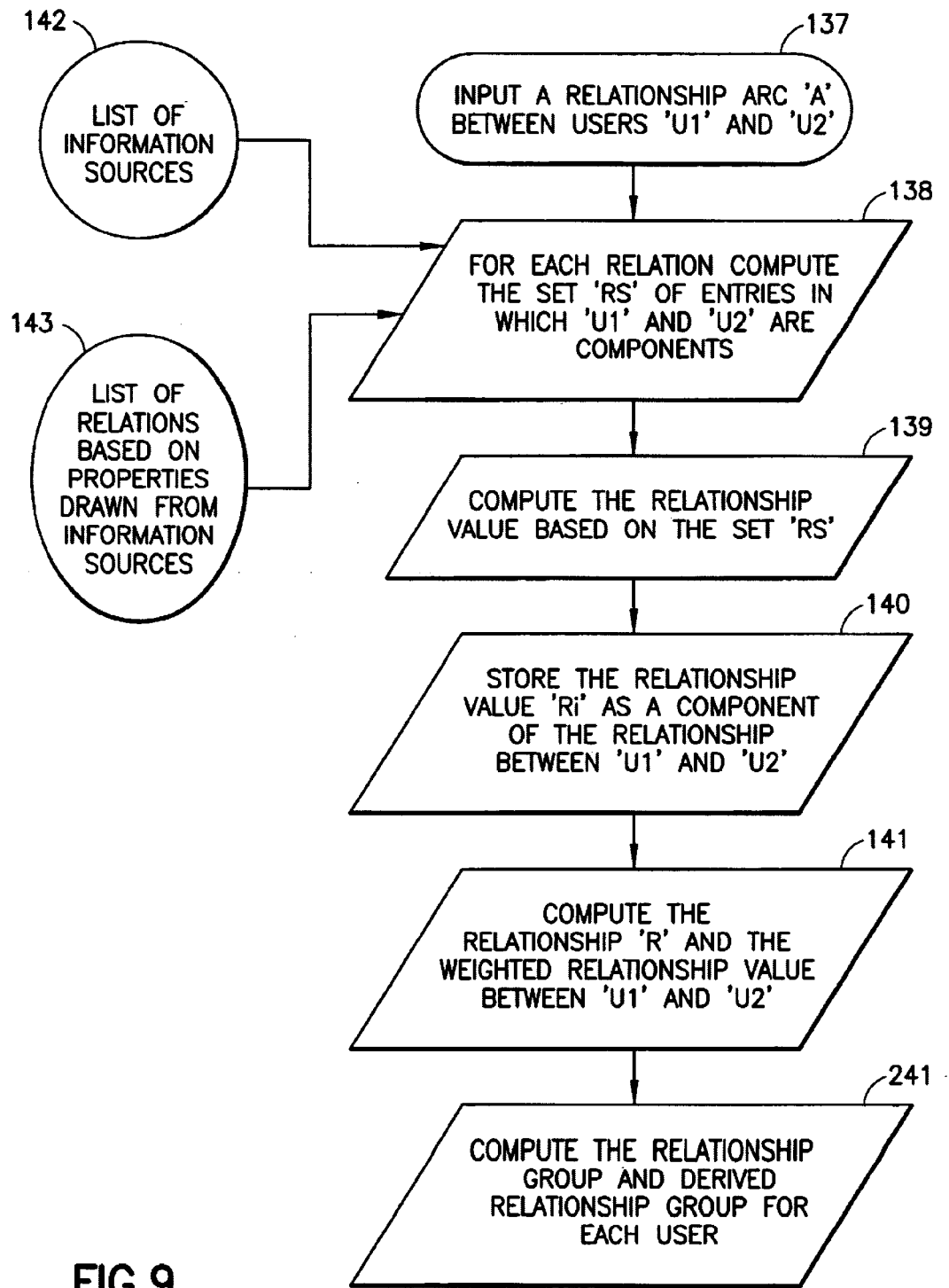
FIG. 9 depicts an example of the relationship value computation logic.

FIG. 9 depicts an example of the relationship value R(x,y) computation logic. In a preferred embodiment, this computation may incorporate any number of information sources (IS) (142) and a list of relations (143) based on properties drawn from the information sources. The information sources (IS) (142) are preferably associated with interpersonal relationships, including but not limited to: a corporate organization chart; mailing list; appointment calendar; telephone log; and e-mail log. As seen in the example functions below, the list of relations (143) in the corporate organization chart include "whether x and y are in the same department" or can be based on management chain information. As depicted, in step 138, a relationship arc "A" (137), representing a relationship between users U1 and U2 is initialized and input to the process along with the list of information sources (142) and relations (143). For each relation, the subset "RS" of IS entries which reference users U1 and U2 are computed. In step 139, the relationship value (Ri) is computed based on the set RS (sample Ri functions are included below). In step 140, the relationship value is stored as a component of the relationship arc "A" between the users U1 and U2. The relationship R(x,y) between two users "U1" and "U2" respectively, is defined to be the arithmetic sum of the individual relationships R(x,y)=sum(is) (Ri(is, x, y)) (each Ri computed in FIG. 9, steps 138–140) where "is" represents an information source such as are listed above. In step 141, the relationship "R" and (optionally) a weighted relationship value (for example as described with reference to FIGS. 7A–B) between U1 and U2 is computed. In other words, the R(x,y) function (step 141) calculates the "communication intensity" between person "x" and person "y."

In a preferred embodiment the following relationship value (Ri) functions are defined:

Ri("corporate organization chart",x,y)=(100/dist_in_org_chart(x,y))

where

"dist_in_org_chart" $(x, y)$ = 1 if $x$ and $y$ are in the same department

= 2 if $x$ manages $y$ or $y$ manages $x$

= 3 if $x$ manages $z$ manages $y$ or vice-versa

Ri("mailing lists",x,y)=100*(on_mailing_lists(x,y)/number_of_mailing_lists(x))
  where "on_mailing_lists(x,y)"=# of "x"s mailing lists which include "y" as a recipient,
  and "number_of_mailing_lists(x)"=# of mailing lists "x" has defined Ri("appointment calendar",x,y)=100*(appointments(x,y)/total_appointments(x))
  where "appointments(x,y)"=# of appointments with "y" on "x"s calendar
  and "total_appointments(x)"=# of appointments on "x"s calendar Ri("telephone log",x,y)=100*(called(x,y)/total_calls(x))
  where "called(x,y)"=# of times "x" calls "y" on the telephone
  and "total_calls(x)"=# of telephone calls "x" makes Ri("e-mail log",x,y)=100*( mailed(x,y)/total_emails(x))
  where "emailed(x,y)"=# of times "x" sends e_mail to "y"
  and "total_emails(x)"=# of email messages "x" sends Those skilled in the art will appreciate that the relationship measure R(x,y) may be enhanced by assigning a preference rating P(is) to each of the information sources which is then used to compute a related relationship measure Rp(x,y)=sum(is)(P(is)*Ri(is,x,y)). In the preferred implementation, the RA calculates the value Rp(x,y) for each person "x" and person "y" in the organization and stores that in a table, constituting the RD.

In step 241, the RA calculates a "relation-group" RG(x) for each person "x". For example,
  RG(x)=all(y), such that Rp(x,y)>=rg_cutoff(x)
  where "rg_cutoff(x)" is a constant numeric value unique to person "x."

Preferably, rg_cutoff(x) is set by the system administrator and modifiable by the user at any time. A large value for rg_cutoff(x) reduces the number of people in RG(x), while a smaller value includes more people.

The RA preferably also calculates a "derived-relationship" DR(x,y) for each person "x" and "y", where each "y" is a person in the relationship group RG(z), such that
  DR(x,y)=sum(z) (Rp(x,z)*Rp(z,y))
and a "derived-relation-group" DRG(x) for each person "x" such that
  DRG(x)=all(y), such that DR(x,y)>=drg_cutoff(x)
  where "drg_cutoff(x)" is a constant numeric value unique to person "x."

Several well-known computer products generally called "Awareness Servers" (AS) are in common use today. Examples include AOL's Instant Messenger and Ubique's VP Buddy. Each user "x" of an AS lists a subset (the "buddy list," or BL(x)) of the other users of the AS in which "x" is interested. Each AS provides an Awareness Client, AC, which the user runs on a client node and lists which of the other users in the BL(x) are currently "on-line." The DRG(x) as described by the present invention provides an automatic way for defining a BL consisting of those users with a derived communication relationship, namely BL(x)=DRG(x).

Many e-mail systems in common use, for example Lotus Notes™, allow a user to define a private address book (PNAB), recording information about other users. The PNAB greatly reduces the time necessary to retrieve information about another user, since the PNAB is stored locally on the user's client computer, and also because it is much smaller and therefore more efficient to search. Further, the PNAB is available when the user is not connected to an intranet or the Internet, for example, when using a portable computer in a standalone or disconnected mode. The present invention includes features for automatically computing the PNAB using the "name-and-address" information NA(y) for another user "y" using the derived communication relationship, namely, PNAB(x)=NA(y) such that "y" is in DRG(x).

In order to further refine the derived relation group DRG(x), the RA preferably computes a "subject-specific relationship" RiS(is, x,y,sub) where "is" is an information source such as one of the list above and "sub" is the contents of the "subject" field (or other text content or description) of the communication (e.g., e-mail):
  RiS(is, x, y, sub)=100*(emailed(x,y,sub)/total_emails(x))
    where "emailed(x,y,sub)"=# of times "x" sends e-mail to "y" on subject "sub"
    and "total$_{13}$ emails(x)" is defined as above.
Further, RpS(x,y,sub) is defined by:
  RpS(x,y,sub)=sum(is) (P(is)*RiS(is,x,y,sub))
for each person "x" and "y" in the RD, and RGS(x,sub):
  RGS(x,sub)=all(y) such that RpS(x,y,sub)>=rg_cutoff(x)
  DRS(x,y,sub)=sum(z) (RpS(x,z,sub)*RpS(z,y,sub))
  DRGS(x,sub)=all(y) such that DRS(x,y,sub)>=drg_cutoff(x)

The RA computes and stores in the RD the above values for all users "x" and communication subjects "sub."

When operating mobile or intermittently connected computing systems, such as a laptop computers, handheld devices or Internet appliances, which must be useful even when not connected to the Internet, important information must be downloaded to the mobile device before the Internet connection is broken. Laptops and other small computers typically have limited storage resources, so it is necessary to choose only the most important information to be copied.

The present invention defines a mechanism for choosing which information to download to such devices, namely if we define DL(x) such that:
  DL(x)=all(doc) such that author(doc) is in DRG(x)
then user "x" downloads exactly the documents in DL(x).

The present invention also includes features for a Communication Intensity Graph mechanism by which relationship information pertaining to communication may be integrated, stored, and used as above. Referring again to FIG. 7A, each communications entity (e.g., a person) is represented by a node (126 . . . 131) in the graph, and each communication path is indicated by a link (701) between the two nodes participating in the communication. A communication intensity vector is computed for each pair of entities, where each dimension in the communication vector represents the Communication Intensity derived from an information source.

*CIV(x,y)=Vector{Ri(s,x,y) for all inter-user-communication information sources "s"}* where Ri is defined as above. In other words, each communication event (e-mail, phone message, meeting invitation, etc.) between two people increases the value of the communication intensity vector between the nodes representing the two people. As a further refinement, the value of each communication event can be increased if the event follows closely (in time) another communication event between the same pair of users. Similarly, the value of a communication event is based on a dictionary analysis of the content of the communication. For example, imperative phrases (such as "you must do") increase the value of a communication event by 10%.

Those skilled in the art will appreciate that a Derived Communication Intensity Graph may be constructed in a similar fashion to the Communication Intensity Graph above, in which the nodes representing entities "x" and "y" are connected by a path labeled by the Derived Communication Intensity between "x" and "y", DR(x,y).

Figure 10:
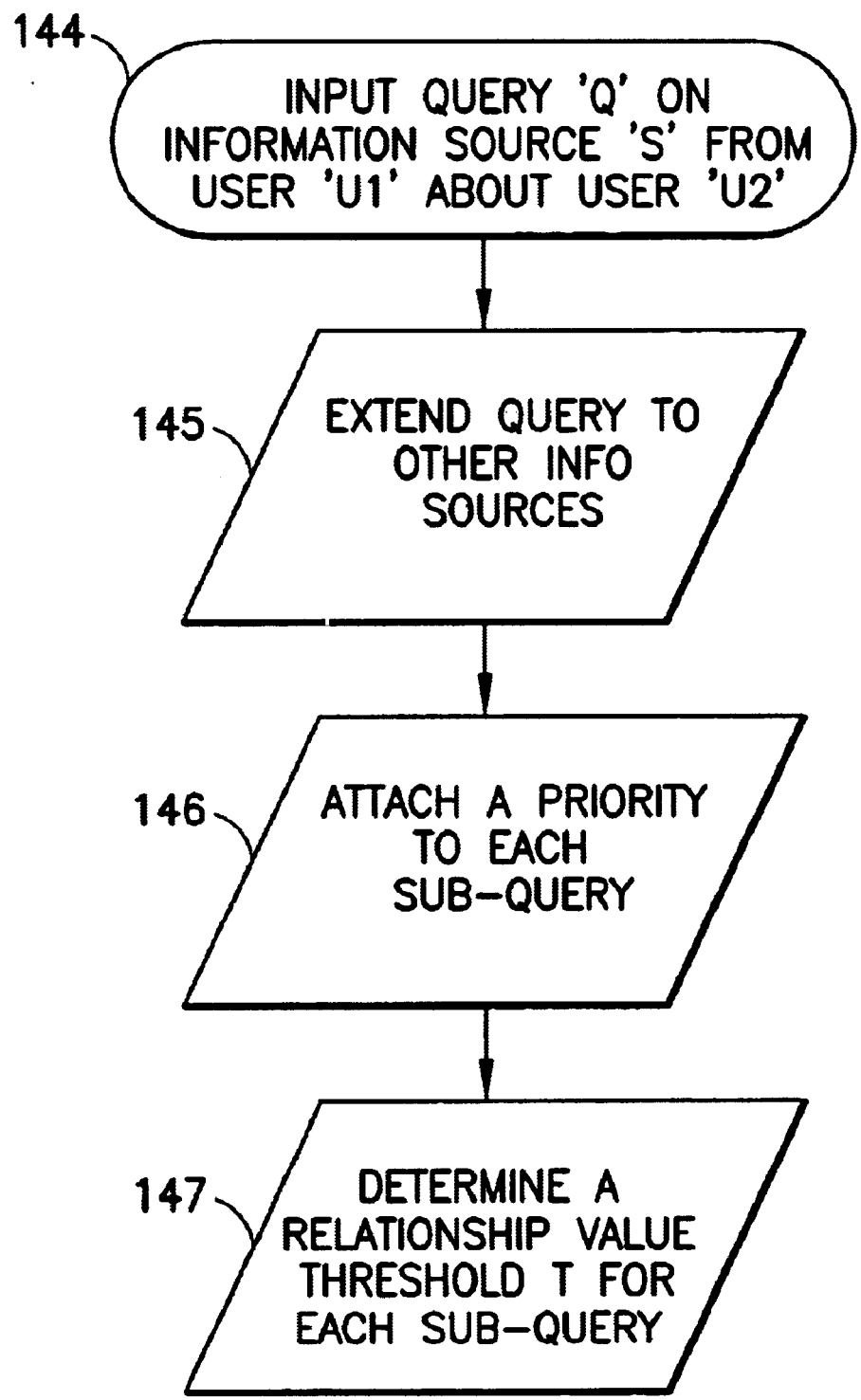
FIG. 10 depicts an example of logic for the query modifier.

FIG. 10 depicts an example of logic for modifying queries. As depicted, in step 144, the query modification component is given as input a query 'Q' to an information source 'S' on behalf of a user 'U1' about a user 'U2.' In step 145, the query is extended to request related information from other information sources beyond that provided just by 'S.' These additional queries are termed 'sub-queries' of the original query Q. For example, if a meeting is desired with a user 'U,' a query is presented asking the Calendar database whether or not the user is available at the desired time. The query would be augmented with sub-queries to ask the Phonebook Information Source for U's phone number and office number, the Org Chart Information Source for U's manager's name and group colleagues' names. A sub-query could also be added to request the availability of other users in user U's derived relation group. In step 146, a priority is attached to each sub-query. In the preferred implementation the priority of a sub-query to be sent to information source 'S2' is derived from the preference rating P(S2) for that information source. In step 147, relationship-value threshold 'T' is derived for each sub-query to be used later by the filter-results process (FIG. 12).

Figure 11:
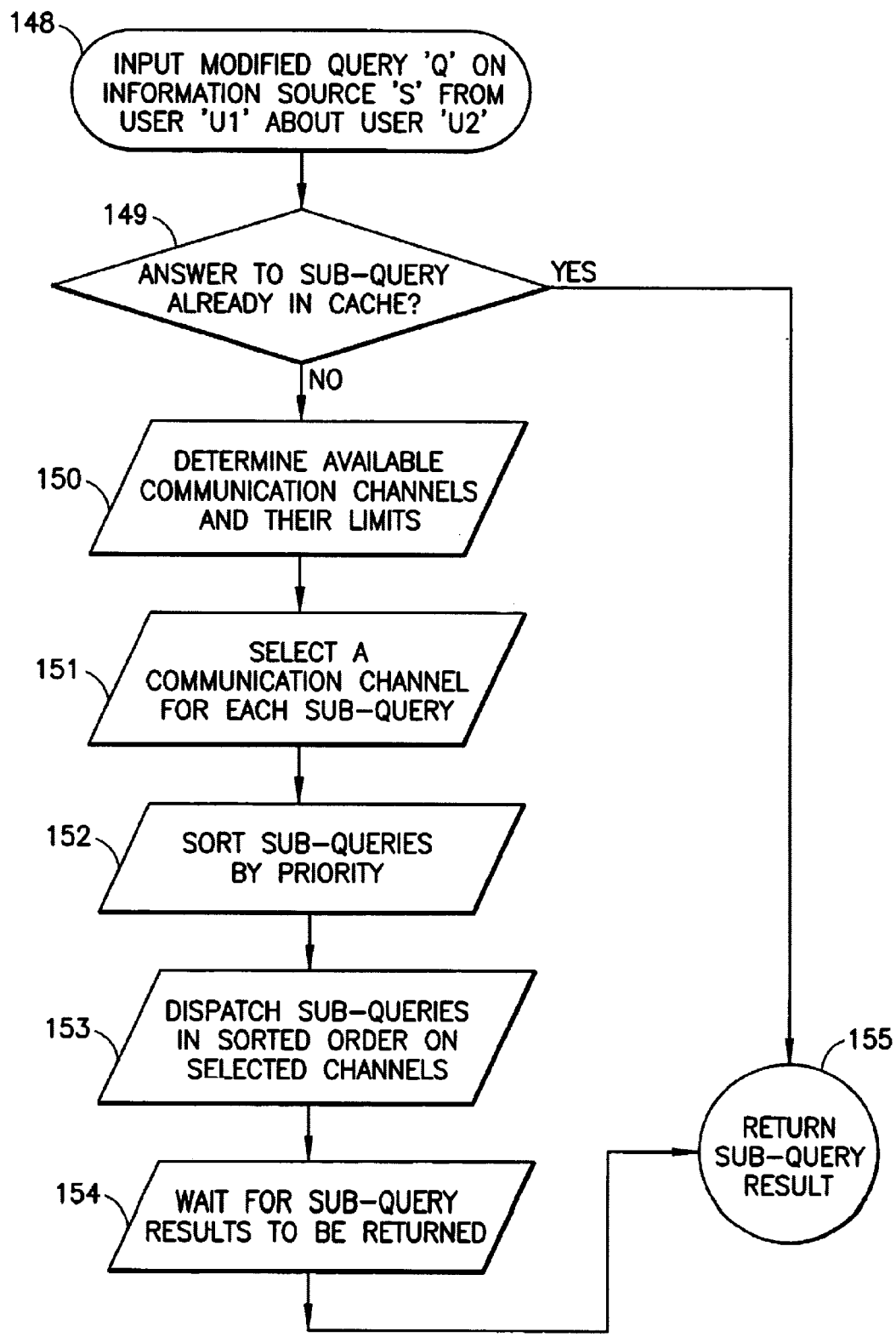
FIG. 11 depicts an example of the query execution logic.

FIG. 11 depicts an example of the query execution logic. As depicted, in step 148, the input is a query Q on information source S from person U1 about person U2. Further, this query has been extended (or modified) with additional sub-queries (as previously described in FIG. 10). In step 149, to speed execution, the query cache is checked to see if any of the sub-queries have been answered recently. If so, in step 155 the sub-query result is returned immediately. If not, the sub-query must be executed completely. A list of available communication channels for this sub-query is created (i.e., connections to information source S) in step 150. A communication channel is selected for each sub-query (step 151) based on the information source and priority. For example, for mobile users, communication channels could include: cellular telephone, two-way pager, and "wait for land-line connection, later," each in turn giving poorer and poorer response time in exchange for cheaper and cheaper execution. In step 152, the sub-queries are sorted by priority, most important first, and then dispatched on the selected channels in sorted order (step 153). When all outstanding sub-queries have been satisfied, the results are assembled (step 154) and returned to the main operation function of the RA (FIG. 6). As is obvious to those skilled in the art, the waiting function (step 154) could easily be enhanced with "time-out" values whereby queries taking too long to execute are discarded. Further, the time-out values could be computed based on the priority of the sub-query and/or the characteristics of the information channel selected. Further still, sub-queries could be returned progressively.

Figure 12:
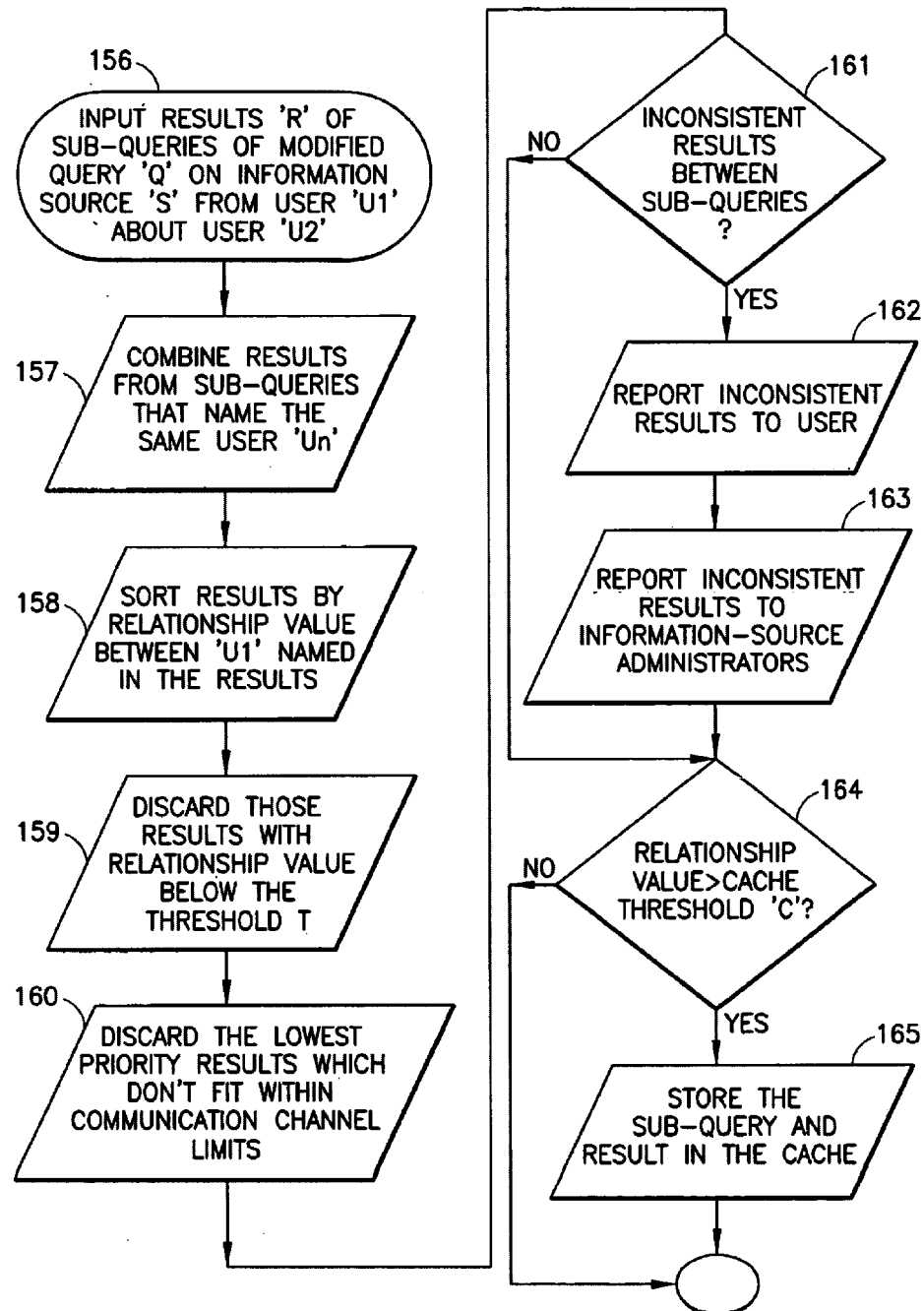
FIG. 12 depicts an example of the logic for filtering query results.

FIG. 12 depicts an example of the logic for filtering query results. As depicted, in step 156, the results "R" of sub-queries of a modified query "Q" on IS "S" from user "U1" about user "U2" are input to the filter-results logic. The sub-query results pertaining to a particular user are combined in step 157, yielding a collection of aggregated results. In step 158, the aggregated results are sorted by relationship value between the user U1 making the query and a user "Un" named in the individual results being aggregated. In step 159, results with relationship values less than the relationship-value threshold are discarded. In step 160, also discarded are lowest priority results that do not fit within communication channel limits. When different information sources contain overlapping information, there is a potential for two results for the same query to be inconsistent with each other (one database may be out-of-date, for example). In step 161, inconsistent results are detected and reported to the user and to system administrators for the original information sources (steps 162 and 163). In step 164, each sub-query is inspected to determine if the relationship value for the result is greater than the cache threshold 'C.' If so, in step 165, the sub-query and result are copied to the cache for reuse during a later Execute-Query step. Since the cache has limited space, the derived-relationship DR(x,y) between user U1 and user U2(i.e. (DR(U1,U2)) is used to manage cache contents. When the cache is full, the previously-cached query result with the lowest DR(x,y) value is discarded from the cache in order to make room for the new query result to be cached.

In a preferred embodiment, the RA (104) of the present invention is implemented as software tangibly embodied on a computer program product or program storage device for execution on a processor (not shown) provided with the client 101, and/or a server including but not limited to a web proxy server. For example, software implemented in a popular object-oriented computer executable code such as Sun Microsystems' JAVA™ provides portability across different platforms. Those skilled in the art will appreciate that other procedure-oriented and object-oriented (OO) programming environments, such as $C^{++}$ and Smalltalk can also be employed.

Those skilled in the art will also appreciate that methods of the present invention may be implemented as software for execution on a computer or other processor-based device. The software may be embodied on a magnetic, electrical, optical, or other persistent program and/or data storage device, including but not limited to: magnetic disks, DASD, bubble memory; tape; optical disks such as CD-ROMs; and other persistent (also called nonvolatile) storage devices such as core, ROM, PROM, flash memory, or battery backed RAM. Those skilled in the art will appreciate that within the spirit and scope of the present invention, one or more of the components instantiated in the memory of the clients 101 or a server could be accessed and maintained directly via disk the network, another server, or could be distributed across a plurality of servers.

Now that the invention has been described by way of a preferred embodiment, with alternatives, various modifications and improvements will occur to those of skill in the art. Thus, it should be understood that the detailed description should be construed as an example and not a limitation. The invention is properly defined by the appended claims.

What is claimed is:

1. A method to optimize information retrieval for a user based on the user's communication relationships, comprising the steps of:
   automatically extracting and integrating relationship information for said user from multiple heterogeneous information sources;
   automatically building and storing a relationship data structure to represent the relationship information; and
   automatically modifying an information retrieval query for said user based on the relationship data structure
   wherein said step of building a data structure further comprises the step of tracking communication intensities between each pair of communication entities via each information source; and integrating the relationship information from the heterogeneous information sources, in response to said tracking step.

2. A method of claim 1, wherein said step of modifying a query comprises the steps of prioritizing and filtering the retrieval of related information.

3. A method of claim 2, further comprising the step of prioritizing and filtering a list of name-to-e-mail address mappings to facilitate sending e-mail.

4. A method of claim 1, wherein said step of modifying a query comprises the steps of augmenting information from the heterogeneous information sources.

5. The method of claim 4, further comprising the step of resolving name ambiguity by using the relationship from the heterogeneous information sources to determine one or more of an e-mail address, phone number, and a full name.

6. A method of claim 4, further comprising the step of modifying the query to create one or more sub-queries.

7. A method of claim 6, further comprising the step of aggregating results from the sub-queries.

8. A method of claim 6, further comprising the step of excluding results from the sub-queries.

9. A method of claim 4, further comprising the step of obtaining relevant information from the heterogeneous information sources, said information selected from the group consisting of one or more of: phone numbers; e-mail addresses: mailing addresses; office location; department; or manager, from various information sources.

10. A method of claim 1, wherein said step of modifying a query comprises the step of modifying a query to optimize delivery of query results.

11. The method of claim 10, further comprising the step of recommending a communication channel based on a recipient characteristic.

12. A method of claim 1, wherein the heterogeneous information sources are selected from the group consisting of one or more of: people-managed data sources; organization charts; mailing lists; calendar entries; personal address books; priority lists of contacts; and automated system log type information including phone logs and e-mail logs.

13. A method of claim 1, further comprising the step of assigning different preferences to the heterogeneous information sources.

14. A method of claim 1, further comprising the step of:
deriving a relation-group for each communication entity based on a pre-specified criterion on said communication intensities.

15. A method of claim 14, further comprising the step of:
selecting relation-group entities of a communication entity based on aggregate communication intensities to the communication entity.

16. A method of claim 15, further comprising the step of: computing an aggregate communication intensity from an entity A to an entity B based on a weighted sum of the communication intensities from said entity A to said entity B via each information source.

17. A method of claim 14, further comprising the step of:
deriving relation-group entities of an entity allowing one or more of an indirect relationship and an inferred relationship.

18. A method of claim 17, further comprising the step of: said deriving step further comprising the step of deriving a relation-group of an entity A, which can include the relation-group entities of an entity in the relation-group of the entity A.

19. A method of claim 17, further comprising the step of calculating aggregate communication intensities taking into account the indirect relationship.

20. A method of claim 14, further comprising the step of driving an awareness service based on a relation-group relationship.

21. A method of claim 14, wherein the relation-group can be subject based.

22. A method of claim 1, further comprising the steps of:
assigning a weight to each information source based on a preference; and computing the aggregate communication intensity, based on the weight and the preference.

23. A method of claim 1, further comprising the step of:
building and maintaining additional persistent data structures based on the results of the query to facilitate the response on future queries, based on the relationship data structure.

24. A method of claim 23 wherein the additional persistent data structure can be a personal address/phone book based on the communication intensity.

25. A method of claim 1, further comprising the step of determining a significance of a relationship between two entities.

26. A method of claim 25, further comprising the step of determining the significance of a relationship based on the aggregate communication intensity.

27. A method of claim 26, wherein the significance of the relationship can be subject based.

28. The method of claim 26, further comprising the step of downloading information based on the significance of the relationship.

29. A method of claim 1, wherein the tracking step can be subject based.

30. The method of claim 1, further comprising the step of caching a document and information based on the significance of the relationship.

31. A method of claim 1, further comprising the step of detecting inconsistency among data in the heterogeneous information sources.

32. The method of claim 31, further comprising the step of detecting changes in the relationship information maintained.

33. The method of claim 32, further comprising the step of propagating the changes.

34. The method of claim 32, further comprising the step of alerting the changes.

35. A method of claim 1, further comprising the steps of:
integrating the relationship information from the multiple heterogeneous sources using a graph wherein each node represents a communication entity, and a link between a pair of nodes represents the existence of a communication relationship between the two nodes.

36. A method of claim 35, further comprising the step of labeling each link with a communication intensity vector, where each dimension of the communication intensity vector represents a communication intensity from an information source.

37. A method of claim 1, further comprising the step of calculating a communication intensity based on a number of communication events.

38. A method of claim 1, further comprising the step of calculating a communication intensity based on both a number of communication events and their temporal characteristics.

39. A method of claim 1, further comprising the step of calculating a communication intensity based on an analysis of a content of a communication event.

40. A program storage device readable by a machine, tangibly embodying a program of instructions executable by the machine to perform method steps for optimize informa tion retrieval based on a user's communication relationships, said method steps comprising:

automatically extracting and integrating relationship information for said user from multiple heterogeneous information sources;

automatically building and storing a data structure to represent the relationship information; and automatically modifying an user's information retrieval query based on the relationship data structure, wherein said step of building a data structure further comprises the step of tracking communication intensities between each pair of communication entities via each information source; and integrating the relationship information from the heterogeneous information sources, in response to said tracking step.

* * * * *